United States Patent
Hulbert et al.

(10) Patent No.: US 6,330,273 B1
(45) Date of Patent: Dec. 11, 2001

(54) APPARATUS FOR CODE TRACKING IN A DIRECT SEQUENCE SPREAD SPECTRUM RECEIVER

(75) Inventors: Anthony Peter Hulbert, Southampton; David Peter Chandler, Romsey, both of (GB)

(73) Assignee: Roke Manor Research Limited, Hampshire (GB)

( * ) Notice: Subject to any disclaimer, the term of this patent is extended or adjusted under 35 U.S.C. 154(b) by 0 days.

(21) Appl. No.: 09/155,394

(22) PCT Filed: Mar. 28, 1996

(86) PCT No.: PCT/GB96/00747
§ 371 Date: Aug. 23, 1999
§ 102(e) Date: Aug. 23, 1999

(87) PCT Pub. No.: WO97/36381
PCT Pub. Date: Oct. 2, 1997

(51) Int. Cl.[7] .............................. A61F 2/06; H04L 27/30; H04B 15/00; H04K 1/00
(52) U.S. Cl. ........................ 375/150; 375/147; 375/206
(58) Field of Search .................................. 375/150, 343, 375/1, 208, 206, 147

(56) References Cited

U.S. PATENT DOCUMENTS

| | | | |
|---|---|---|---|
| 4,785,463 | * | 11/1988 | Janc et al. .............................. 375/1 |
| 5,029,181 | * | 7/1991 | Endo et al. .............................. 375/1 |
| 5,347,536 | * | 9/1994 | Meehan ................................... 375/1 |
| 5,402,450 | * | 3/1995 | Lennen .................................... 375/6 |
| 5,574,754 | * | 11/1996 | Kurihara et al. .................... 375/367 |
| 5,600,670 | * | 2/1997 | Turney ................................. 375/208 |
| 5,724,384 | * | 3/1998 | Kim et al. ........................... 375/208 |
| 5,729,570 | * | 3/1998 | Magill ................................. 375/206 |
| 5,737,362 | * | 4/1998 | Hyun et al. ......................... 345/206 |
| 5,832,023 | * | 11/1998 | Latva-aho .......................... 375/200 |
| 5,875,218 | * | 2/1999 | Barham et al. ..................... 375/376 |
| 6,023,489 | * | 2/2000 | Hatch ................................. 375/208 |

* cited by examiner

Primary Examiner—Stephen Chin
Assistant Examiner—Tony Al-Beshrawi
(74) Attorney, Agent, or Firm—Crowell & Moring LLP

(57) ABSTRACT

A direct sequence spread spectrum receiver includes correlators for handling prompt, late and early signals. An estimator is used to provide an estimate of the prompt signal and this used in a multiplication process with the late and early signals. The resultant signals are further processed to generate control signals.

15 Claims, 2 Drawing Sheets

APPARATUS FOR CODE TRACKING IN A DIRECT SEQUENCE SPREAD SPECTRUM RECEIVER

BACKGROUND OF THE INVENTION

1. Field of the Invention

This relates to receivers for direct sequence spread spectrum and is concerned with code tracking part of the receiving apparatus.

2. Description of the Related Art

The normal implementation of a code tracking device for spread spectrum consists of a so called early prompt late tracking loop and this involves energy detection of the correlated wave form for a correlation that is performed early, normally half a chip early, and a correlation of energy for a chip that is performed late, normally half a chip late. A timing discrimination curve is then generated by subtracting the early from the late and this is used to close a feedback loop to adjust the time, such that the prompt occurs at the correct time.

U.S. Pat. No. 5,402,450 discloses a method and apparatus for estimating the magnitude and phase of multipath induced error in the position in time of the peak of a composite autocorrelation function by synchronising a reference signal to the timing of a received composite signal is synchronised to a reference signal. Time variations between early and late gate timing points of corrupted and uncorrupted autocorrelation functions are detected by employing scanning correlators.

U.S. Pat. No. 5,414,729 discloses a pseudorandom noise ranging receiver which compensates for multipath distortion by making use of multiple correlator time delay spacing. The receiver consists of a sampling circuit, multiple carrier and code synchronising circuits and multiple digital correlators. The sampling circuit provides digital samples of a received composite signal to each of several receiver channel circuits. The synchronising circuits are preferably non-coherent and track any phase shifts in the received signal and adjust the frequency and phase of a locally generated carrier reference signal accordingly. The correlators provide signals which are fed to a parameter estimator from which the delay and phase parameters of the direct path signal from which a range measurement can be corrected.

U.S. Pat. No. 5,347,536 discloses a method of multipath noise reduction for spread spectrum signals in which phase variations among early and prompt lags are detected. Phase and pseudo-range observables are derived from earlier correlation lags and used to generate a multipath-free code cross-correlation shape. Deviations from that shape are used to infer the magnitude of multipath and to generate corrections for pseudo-range observables. Phase variations from early and prompt lags are used to generate corrections for carrier-phase observables.

An aim of the invention is to remove the need to have the early and late correlations taking place at half a chip but specifically, to enable them to be applied at plus or minus one chip. This results in particular difficulties in the normal implementation, in that at plus or minus one chip for a circuit that is operating at the normal timing, the correlation falls to zero and therefore energy detection of the signals will tend to be very noisy and thus a normal implementation would lead to a discrimination curve that is itself very noisy and would lead to a very jittery timing loop.

The apparatus uses spread spectrum signals, which have been Nyquist filtered and therefore it uses signals, the correlation functions of which still has a good slope on it through the zero points and the basic problems are solved by not performing energy detection on the measurements taken or the correlations taken at these intervals but rather, coherently compensating them against a phase reference derived from the prompt signal and thereby reducing the effect of the noise and thus enabling a discrimination signal to be derived which is of a similar signal to noise ratio as would obtained in the more conventional plus or minus half a chip early/late situation.

BRIEF SUMMARY OF THE INVENTION

According to one aspect of the present invention, there is provided apparatus for code tracking in a direct sequence spread spectrum receiver, comprising means for receiving a signal, means for converting the received signal into an inphase and quadrature signal, and analogue to digital converter means for converting the inphase and quadrature signals into digital signals;

characterised in that said apparatus further comprises a first correlator for handling prompt signals, a second correlator for handling late signals, a third correlator for handling early signals, estimation means for obtaining estimates of the output signals from the first correlator, first and second multiplying and adding means for multiplying the estimates with the output signals from the second and third correlators respectively and adding the inphase and quadrature channels together, subtraction means for subtracting the result from said first and second adding means, and control means arranged to receive the output signals from said subtracting means and generate control signals for the analogue to digital converter means.

According to another aspect of the present invention, there is provided apparatus for code tracking in a direct sequence spread spectrum receiver, comprising means for receiving a signal, converting means for converting the received signal into an inphase and quadrature signal, and analogue to digital converter means for converting the inphase and quadrature signals into digital signals;

characterised in that said apparatus farther comprises a first correlator for handling prompt signals, a second correlator for handling late signals, a third correlator for handling early signals, a frequency phase discrimination means for receiving the signals from said first correlator and generating a signal for controlling said converting means in a manner such that a coherent signal is contained on one signal phase channel, subtractor means for subtracting the output signals from said second and third correlators and control means connected to said subtractor means for controlling said analogue to digital converters.

According to a further aspect of the present invention there is provided a method of acquiring code synchronisation between a received direct sequence spread spectrum signal and a locally generated reference code which locally generated reference code is representative of a spreading code used to spread the spectrum of said received signal, comprising the steps of:

converting said received signal into inphase and quadrature signals representative of said received signal, analogue to digital converting said inphase and quadrature phase signals into digital representations, in accordance with a selectively controllable sampling rate, correlating said digital inphase and said digital quadrature signals with said reference code in dependence upon a prompt temporal position;

characterised in that said method further comprises the steps of:

further correlating at least one of said digital inphase and said digital quadrature phase signals with said reference code in dependence upon a late temporal position, further correlating at least one of said digital inphase and said digital quadrature phase signals with said reference code in dependence upon an early temporal position, forming an error signal in accordance with a difference between said early further correlation and said late further correlation, and adjusting said controllable sampling rate in accordance with said error signal.

BRIEF DESCRIPTION OF THE DRAWINGS

Various embodiments of the present invention will now be described with reference to the accompanying drawings wherein.

DETAILED DESCRIPTION OF THE INVENTION

Figure 1:
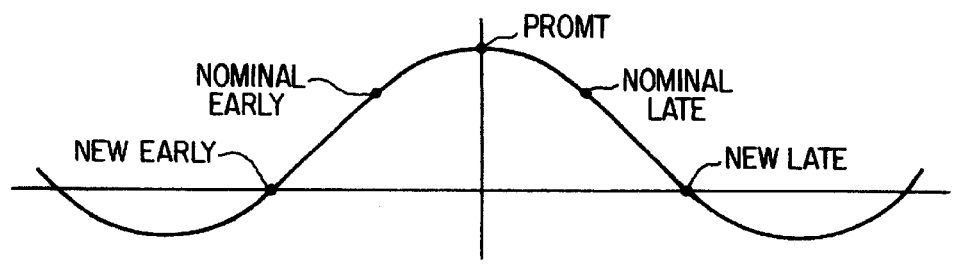
FIG. 1 shows a typical correlation function for the output of a correlator.

Referring to FIG. 1 a typical correlation function for the output of a correlator is shown, indicating the normal nominal positions for the early, late and prompt correlations, we well as the new proposed positions for the early and late positions, the prompt positions obviously being the same.

Figure 2:
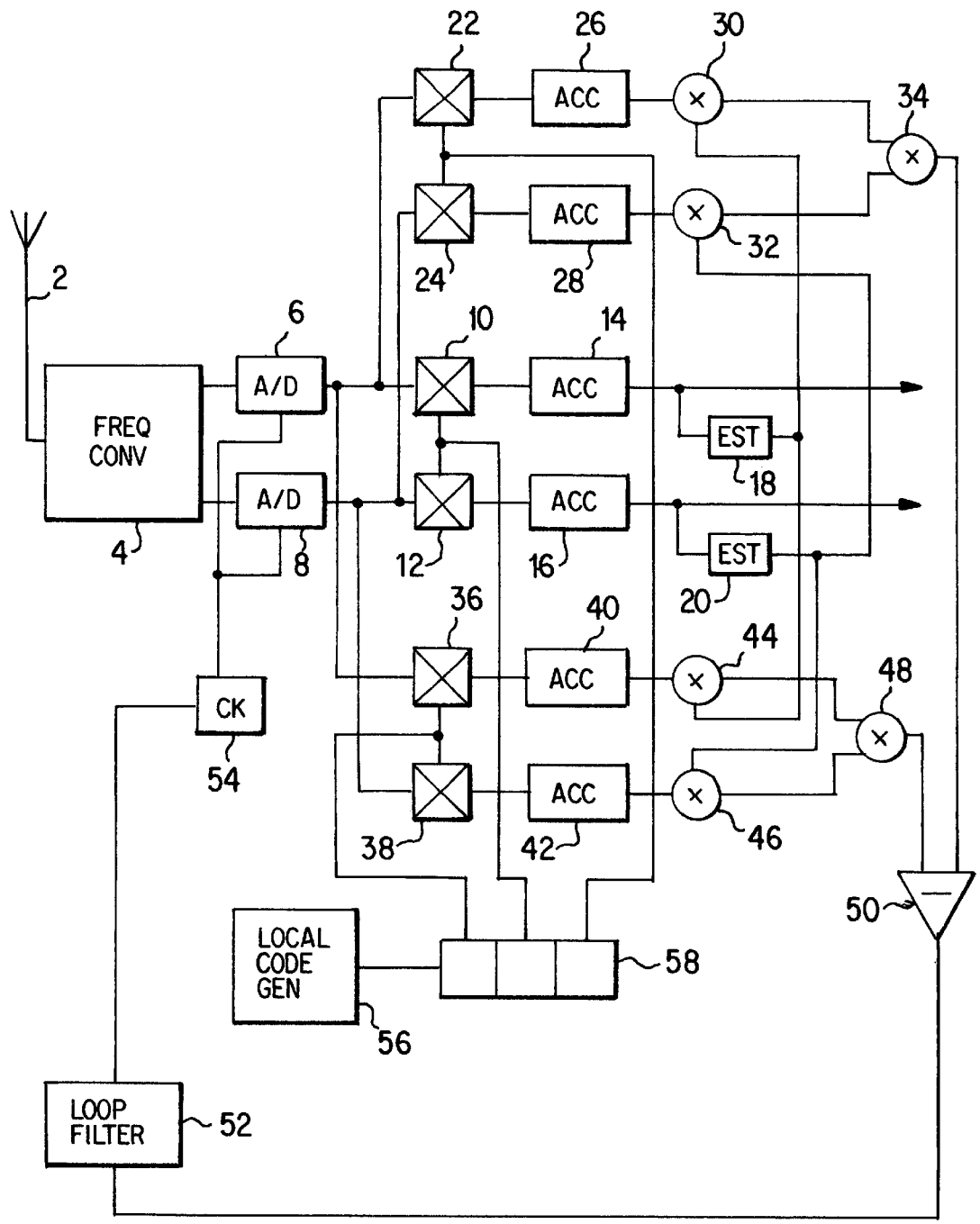
FIG. 2 shows a block diagram of a first embodiment of the invention.

Referring to FIG. 2, signal input generation means 2 shown as an antenna feeds a frequency converter means 4, which generates I and Q signals which feed into a pair of analogue to digital converters 6, 8. The output of these feed into three half complex correlators. The correlator comprising units 10, 12, 14, 16 is for the prompt position, thus the I sample signal of the output of the converter 6 is multiplied by the prompt code in the multiplier 10 and is accumulated in the accumulator 14, and similarly for multiplier 12, and accumulator 16 for the Q channel. The outputs for the prompt signal pass on to other circuitry used as familiar to those in art for demodulation purposes. The outputs are also fed to estimation means 18, 20 which essentially in this embodiment serve as filters to enhance the signal to noise ratio of the measurement of this position.

Similar operations are performed in the late correlator pair, consisting of multiplier 22 and accumulator 26 for the I channel and multiplier 24 and accumulator 28 for the Q channel, however the outputs of these are multiplied by the estimates derived from the prompt channel in multipliers 30, 32 and added together in the adder 34.

Similarly, for the early channel similar operations are performed by the multiplier 36 and the accumulator 40, the multiplier 38 and accumulator 42. The output from the accumulators 40, 42 are also multiplied by the estimates by the multiples 44, 46, the outputs of which are added by the adder 48. The outputs of the adders 34, 48 are then subtracted in subtracting means 50. It will be appreciated that these operations can be performed in a different order and in fact two multipliers can be saved if the subtractions are performed prior to the multiplications however, this embodiment better explains the principle.

The output of subtractor means 50 is fed to loop filter means 52 and used to control a clock generator 54 for the sampling of the converters 6, 8 in order to advance or retard the timing of the sampling in such a way to cause the prompt signal to coincide with correlation at the peak of the correlation function. It will be appreciated that additional embodiments of this invention are possible, for example, the sampling may initially take place at a higher rate than one sample per chip and the generation of samples at one sample per chip may be formed through interpolator means and the timings of the samples generated through the interpolator means can be established through setting up the correct interpolator coefficients and the selection of these can also be controlled from the output of the filter means 52. It will also be appreciated that under some circumstances there may be an improvement if the outputs of estimates 18, 20 are so controlled as to normalise them so that they are constant amplitude and that they embody only the phase information of that estimate.

A local code generator 56 controls the multipliers 10, 12, 22, 24, 36, 38 by way of the circuit 58 which generates the early/late/prompt signal.

Figure 3:
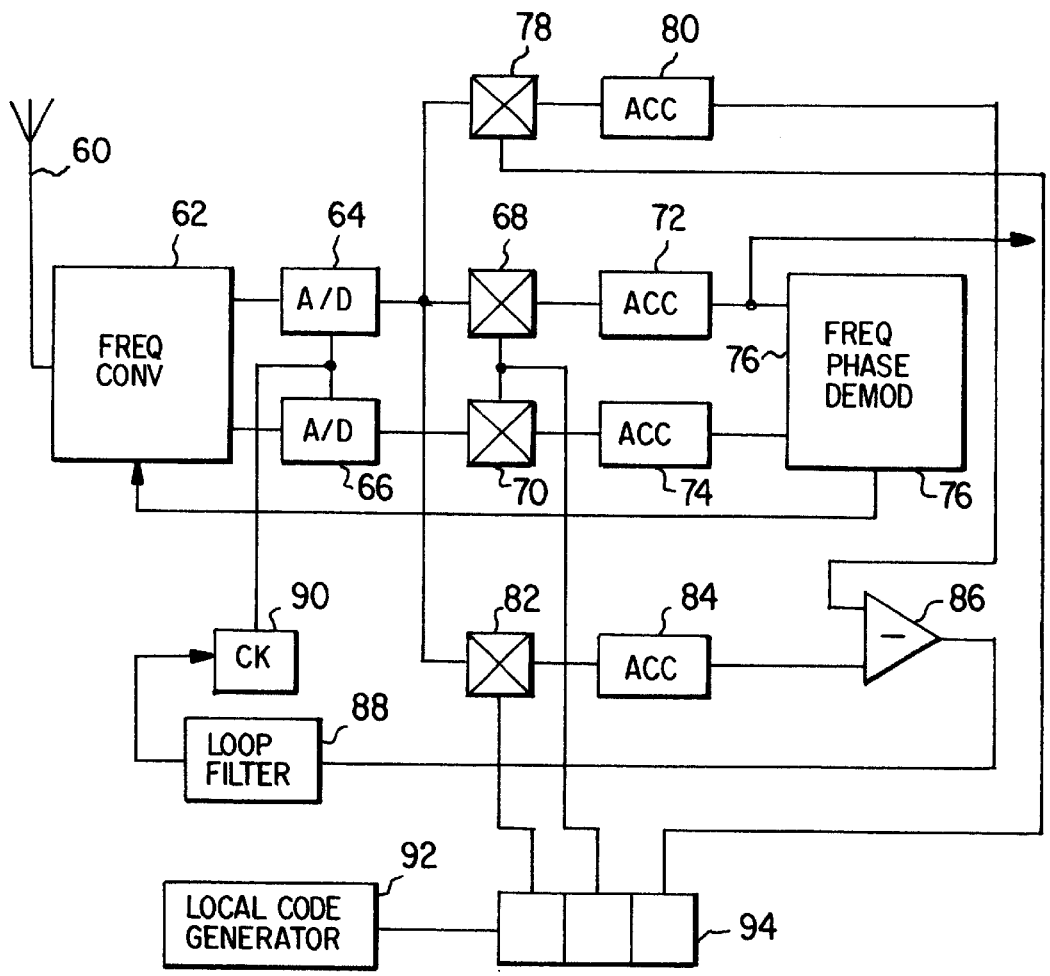
FIG. 3 shows a block diagram of a second embodiment of the invention.

A further implementation is shown in FIG. 3. Referring to FIG. 3 the signal generation means 60 is an antenna. A frequency converter 62 feeds the I and Q channels via analogue to digital converters 64, 66. As before, the multiplier 68 and accumulator 72 together form a correlator and similarly the multiplier 70 and the accumulator 74 form a further correlator. The outputs from the correlators feed into frequency phase discrimination means 76 which generates a frequency control signal in the manner familiar to those versed in the art which feeds back to the frequency converter 62 to control the phase of the conversion in such a way that the coherent signal is all contained on the I channel. In this way, for the early and the late signals, it becomes unnecessary to correlate on the Q channel and thus, a single multiplier 78 and single accumulator 80 only is provided which generates the early signal, and similarly for the late signal a multiplier 82 and an accumulator 84 only is provided. The outputs from the accumulators 80, 84 are subtracted in subtraction means 86, which feeds the loop filter 88 for controlling the clock generator means 90.

A local code generator 92 generates early/late/prompt signals by way of the circuit 94 for controlling the multipliers 68, 70, 78, 82.

It will be readily appreciated by those skilled in the art that alternative arrangements fully within the scope of the invention. For example, connection to the frequency converters may be made via cables.

What is claimed is:

1. Apparatus for code tracking in a direct sequence spread spectrum receiver, comprising means for receiving a signal, means for converting the received sign into an inphase and quadrature signal, and analogue to digital converter means for converting the inphase and quadrature signals into digital signals;

characterized in that said apparatus further comprises a first correlator for handling prompt signals, a second correlator for handling late signals, a third correlator for handling early signals, estimation means for obtaining estimates of the output signals from the first correlator, first and second multiplying and adding means for multiplying the estimates with the output signals from the second and third correlators respectively and adding the inphase and quadrature channels together, subtraction means for subtracting the result from said first and second adding means, and control means arranged to receive the output signals from said subtracting means and generate control signals for the analogue to digital converter means.

2. Apparatus as claimed in claim 1, wherein each correlator comprises a multiplier and an accumulator and accumulator for handling the quadrature signal.

3. Apparatus as claimed in claim 1, wherein the control means comprises a loop filter and clock generator.

4. Apparatus as claimed in claim 2, wherein the multipliers in each correlator are controlled by a code generator and means for generating early/late/prompt signal codes.

5. Apparatus for code tracking in a direct sequence spread spectrum receiver, comprising means for receiving a signal, converting means for converting the received signal into an inphase and quadrature signal, and analogue to digital converter means for converting the inphase and quadrature signals into digital signals;

characterized in that said apparatus further comprises a first correlator for handling prompt signals, a second correlator for handling late signals, a third correlator for handling early signals, a frequency phase discrimination means for receiving the signals from said first correlator and generating a signal for controlling said converting means in a manner such that a coherent signal is contained on one signal phase channel, subtractor means for subtracting the output signals from said second and third correlators and control means connected to said subtractor means for controlling said analogue to digital converters.

6. Apparatus as claimed in claim 5, wherein the first correlator comprises a multiplier and accumulator for each signal channel.

7. Apparatus as claimed in claim 6, wherein the second and third correlators comprise a multiplier and accumulator for each signal channel.

8. Apparatus as claimed in claim 5, wherein the control means comprises a loop filter and clock generator.

9. Apparatus as claimed in claim 7, wherein the multipliers in each correlator are controlled by a code generator and means for generating early/late/prompt signals.

10. A method of acquiring code synchronisation between a received direct sequence spread spectrum signal and a locally generated reference code which locally generated reference code is representative of a spreading code used to spread the spectrum of said received signal, comprising the steps of:

converting said received signal into inphase and quadrature signals representative of said received signal, analogue to digital converting said inphase and quadrature phase signals into digital representations, in accordance with a selectively controllable sampling rate, correlating said digital inphase and said digital quadrature signals with said reference code in dependence upon a prompt temporal position;

characterised in that said method further comprises the steps of:

further correlating at least one of said digital inphase and said digital quadrature phase signals with said reference code in dependence upon a late temporal position, further correlating at least one of said digital inphase and said digital quadrature phase signals with said reference code in dependence upon an early temporal position, forming an error signal in accordance with a difference between said early further correlation and said late further correlation, and adjusting said controllable sampling rate in accordance with said error signal.

11. Apparatus as claimed in claim 2, wherein the control means comprises a loop filter and clock generator.

12. Apparatus as claimed in claim 3, wherein the multipliers in each correlator are controlled by a code generator and means for generating early/late/prompt signal codes.

13. Apparatus as claimed in claim 6, wherein the control means comprises a loop filter and clock generator.

14. Apparatus as claimed in claim 7, wherein the control means comprises a loop filter and clock generator.

15. Apparatus as claimed in claim 8, wherein, the multipliers in each correlator are controlled by a code generator and means for generating early/late/prompt signals.

* * * * *